(12) United States Patent
Knoll et al.

(10) Patent No.: US 10,081,012 B2
(45) Date of Patent: Sep. 25, 2018

(54) HYBRID ION EXCHANGE MATERIAL AND METHOD FOR MAKING THE SAME

(71) Applicant: Graver Technologies LLC, Glasgow, DE (US)

(72) Inventors: James Knoll, Glenn Gardner, NJ (US); Katie Henderson, Smyrna, DE (US); Anatoly Bortun, Middletown, DE (US)

(73) Assignee: Graver Technologies LLC, Glasgow, DE (US)

( * ) Notice: Subject to any disclaimer, the term of this patent is extended or adjusted under 35 U.S.C. 154(b) by 0 days.

(21) Appl. No.: 15/869,410

(22) Filed: Jan. 12, 2018

(65) Prior Publication Data

US 2018/0133708 A1    May 17, 2018

Related U.S. Application Data

(62) Division of application No. 14/637,786, filed on Mar. 4, 2015, now Pat. No. 9,901,918.

(51) Int. Cl.

| | | |
|---|---|---|
| *B01J 41/10* | (2006.01) | |
| *C02F 1/42* | (2006.01) | |
| *B05D 1/12* | (2006.01) | |
| *C02F 1/28* | (2006.01) | |
| *C02F 101/14* | (2006.01) | |
| *C02F 101/10* | (2006.01) | |
| *C02F 103/32* | (2006.01) | |

(52) U.S. Cl.
CPC .............. *B01J 41/10* (2013.01); *B05D 1/12* (2013.01); *C02F 1/288* (2013.01); *C02F 1/281* (2013.01); *C02F 1/283* (2013.01); *C02F 1/42* (2013.01); *C02F 2001/422* (2013.01); *C02F 2101/103* (2013.01); *C02F 2101/105* (2013.01); *C02F 2101/14* (2013.01); *C02F 2103/32* (2013.01)

(58) Field of Classification Search
CPC .................................................... B01J 41/20
See application file for complete search history.

(56) References Cited

U.S. PATENT DOCUMENTS

| | | |
|---|---|---|
| 4,178,270 A | 12/1979 | Fujita et al. |
| 4,692,431 A | 9/1987 | Weller |
| 5,234,876 A | 8/1993 | Swaroop et al. |
| 5,277,931 A | 1/1994 | Maglio et al. |
| 5,401,481 A | 3/1995 | Rochelle et al. |
| 5,948,265 A | 9/1999 | Wakamatsu et al. |
| 6,914,034 B2 | 7/2005 | Vo |
| 7,378,372 B2 | 5/2008 | Sylvester |
| 7,429,551 B2 | 9/2008 | Vo |
| 7,572,380 B2 | 8/2009 | Cannon et al. |
| 8,178,065 B2 | 5/2012 | Al-Zeghayer et al. |
| 8,242,051 B2 | 8/2012 | Rao et al. |
| 2008/0145410 A1 | 6/2008 | Ambuhl et al. |
| 2008/0311288 A1 | 12/2008 | Dong |
| 2009/0270253 A1 | 10/2009 | Yang et al. |
| 2010/0122708 A1 | 5/2010 | Sears et al. |
| 2014/0021139 A1 | 1/2014 | Choo |

FOREIGN PATENT DOCUMENTS

| | | |
|---|---|---|
| EP | 0398636 B1 | 9/1996 |
| EP | 0815939 | 1/1998 |
| GB | 1581993 | 12/1980 |

OTHER PUBLICATIONS

Baur, GB, et al. Activated carbon fibers modified by metyal oxide as effective structured adsorbents for afcetaldehyde. Catalysis Today. Published online Dec. 26, 2014. vol. 249; Abstract, p. 254.
"Inorganic Ion Exchangers" Von C.B. Amphlett, Topics in Inorganic and General Chemistry. Herausgeg. v. P. L. Robinson. Monograph 2. Elsevier Publishing Company, Amsterdam-London-New York 1964. 1. Aufl., XI, 141 S., 36 Abb., 32 Tab., geb. DM 22.
Hartmann, S, et al. Challenges and strategies in the synthesis of mesoporous alumina powders and hierarchical alumina monoliths. Materials. 2012. vol. 5. No. 2; pp. 339-344; figures 2b, d.

*Primary Examiner* — Peter F Godenschwager
(74) *Attorney, Agent, or Firm* — Robert Curcio; DeLio, Peterson & Curcio, LLC

(57) ABSTRACT

A high capacity hybrid ion exchange material with enhanced ability to selectively remove molecular (organics) and anionic (fluoride ion and oxyanions of phosphorus and arsenic) species from drinking water, industrial streams, and wastes, for applications predominantly in the medical and food industries, and a method for preparing the same.

9 Claims, 5 Drawing Sheets

ION EXCHANGE CAPACITIES OF SOME IONS ON HYBRID ION EXCHANGE MATERIALS

| SORBENT | IEC-F, mg/g | IEC-PO$_4$, mg/g | IEC-AsO$_4$, mg/g |
|---|---|---|---|
| 60%Al$_2$O$_3$-40%TiO$_2$ Example 1 | 12 | 55 | 20 |
| 75%Al$_2$O$_3$ - 20%TiO$_2$ - 5%MnO$_2$ Example 2 | 15 | 55 | 21 |
| 50%Al$_2$O$_3$ - 50%Fe$_2$O$_3$ Example 3 | 12 | 50 | 18 |
| 70% Al$_2$O$_3$ - 20%CeO$_2$ - 10% ZrO$_2$ Example 4 | 15 | 50 | 20 |
| Activated Alumina AA400 | 15 | 20 | 7 |
| GFO, Granular Ferric Oxide | 10 | 35 | 20 |
| MetSorb TiO$_2$ | 12 | 42 | 17 |
| Zirconium hydrous oxide | 15 | 60 | 20 |

FIG. 1

| Sample | Octahedral Al, % | Pentahedral Al, % | Tetrahedral Al, % |
|---|---|---|---|
| Al(OH)₃ | 100 | 0 | 0 |
| 60% Al₂O₃ - 40% TiO₂ Example 1 | 70 | 20 | 10 |
| 75% Al₂O₃ - 20% TiO₂ - 5% MnO₂, Example 2 | 75 | 20 | 5 |
| 50% Al₂O₃ - 50% Fe₂O₃ Example 3 | 80 | 15 | 5 |
| 70% Al₂O₃ - 20% CeO₂ - 10% ZrO₂, Example 4 | 70 | 15 | 10 |

FIG. 2

EFFECT OF THERMAL TREATMENT ON AsO$_4$ AND F ION UPTAKE
BY THE HYBRID ADSORBENT OF EXAMPLE 1

| Ion | IEC 100°C, mg/g | IEC 250°C, mg/g | IEC 350°C, mg/g | IEC 450°C, mg/g |
|---|---|---|---|---|
| AsO$_4$ | 20 | 17 | 16 | 13 |
| F | 12 | 10 | 9 | 9 |

FIG. 5

HYBRID ION EXCHANGE MATERIAL AND METHOD FOR MAKING THE SAME

BACKGROUND OF THE INVENTION

1. Field of the Invention

This invention relates to high capacity hybrid ion exchange material with enhanced ability to selectively remove molecular (organics) and anionic (fluoride ion and oxyanions of phosphorus and arsenic) species from drinking water, industrial streams, and wastes, for applications predominantly in the medical and food industries.

2. Description of Related Art

Activated carbon has been widely used in different water treatment applications for decades. For example, activated carbon is present in home water purification systems due to the ability to remove efficiently volatile organic compounds, pesticides, chlorine, odor, and bad taste. Adsorption performance of activated carbon, capacity, and selectivity, depend on various factors. The most critical parameters include: a) surface area that can vary from 600 $m^2/g$ up to 2000 $m^2/g$; b) total pore volume that can vary from 0.5 $cm^3/g$ up to 1.5 $cm^3/g$; and, c) pore size distribution.

Microporous activated carbons with pore size less than 2 nm exhibit high affinity towards small organic molecules, and volatile organic compounds such as chloroform; however, due to size exclusive mechanisms they do not adsorb larger organic compounds. Mesoporous activated carbons with pore size from 2 nm to 50 nm exhibit a high affinity towards large organic molecules such as pesticides and herbicides, as well as to colloidal particles, including colloidal particles of lead.

A positively charged surface of activated carbons affords weak anion exchangers that are able to adsorb some anions, including oxyanions of arsenic. Anion exchange capacity of activated carbons is extremely small in comparison with polyvalent metal (Fe, Ti, Zr, etc.) hydrous oxides used for selective removal of As, P, V, Sb, Cr, Se, etc., anions from different aqueous streams (see, e.g., C. B. Amphlett, Inorganic Ion Exchangers, Elsevier, New York (1964)).

In order to improve the anion-exchange function of activated carbons, impregnation with different polyvalent metal hydrous oxides has been proposed and implemented, which results in the formation of composite ion exchange materials. Different types of active carbon ranging from powders to granular, from micro- to meso-porous, as well as variety of impregnation techniques (impregnation using excess of metal containing solution, incipient wetness, chemical vapor deposition, etc.), have been tried for addition of an active inorganic component. Furthermore, hydrous oxides of Fe, Zr, Ti, Al, etc., have been tried as doping active media (see, e.g., U.S. Pat. No. 4,178,270; U.S. Pat. No. 4,692,431; U.S. Pat. No. 5,277,931; U.S. Pat. No. 5,948,265; U.S. Pat. No. 6,914,034; U.S. Pat. No. 7,378,372; U.S. Pat. No. 7,429,551; U.S. Pat. No. 7,572,380; U.S. Pat. No. 8,178,065; U.S. Pat. No. 8,242,051; U.S. Patent Publication No. 2014/0021139; GB 1581993; and, EP 0815939).

In general, anion exchange properties of composite materials depend on the type of impregnated oxide chosen, and as a rule capacity increases up to a certain point with an increase of inorganic oxide content; however, the correlation between the amount of dopant oxide and capacity is not universal, as in many cases capacity is a function of a specific metal oxide phase/structure formed in the pores and it can vary significantly for similar loadings of the same polyvalent metal oxide. Moreover, as the active metal oxide component is deposited in the pores of activated carbon carrier, the high values of loading result in blocking the activated carbon pores, thus reducing its efficiency for removal of organic molecules. In other words, an attempt to increase ion exchange capacity of composite adsorbent above a maximum point is accompanied by a decrease in capacity towards organics. Preferred loading of polyvalent metal oxide 10 wt % to 20 wt % has been empirically shown to provide composite media the ability to remove efficiently both organic and inorganic species; but, even highest possible loadings do not produce adsorbents with ion exchange capacity close or equal to that of individual polyvalent metal hydrous oxide used as dopants.

SUMMARY OF THE INVENTION

Bearing in mind the problems and deficiencies of the prior art, it is therefore an object of the present invention to develop a cost-efficient composite carbon-mineral adsorbent (powders, granules, or shaped) possessing a high affinity and capacity (preferably not less than 80% of the undoped support) towards organic molecules and a high affinity and capacity close to (not less than 80%) or equal to that of the individual metal hydrous oxide used for selective sorption of fluoride ion and oxyanions of arsenic and phosphorus.

The above, which will be apparent to those skilled in the art, is achieved in the present invention which is directed to a hybrid ion exchange material comprising: an activated carbon carrier; mixed oxide including alumina; and doping polyvalent metal oxide including titanium, zirconium, tin, cerium, lanthanum, iron, or manganese, or any combination thereof; wherein the mixed oxide or the doping polyvalent metal oxide or both are configured to selectively adsorb organic molecules, fluoride ion, or oxyanions of phosphorus and arsenic.

The alumina based mixed oxide is preferably impregnated or deposited in the pores of the activated carbon carrier, and may be in octahedral, pentahedral, or tetrahedral coordination, or a combination thereof. The amount of pentahedrally coordinated alumina is from about 10% to about 30% and an amount of tetrahedrally coordinated alumina is from about 5% up to about 15%.

The content of the mixed oxide in adsorbent is preferably about 5 wt % to about 30 wt %, and more preferably about 10 wt % to about 20 wt %.

The content of the alumina in the mixed oxide is preferably about 20 wt % to about 80 wt %, and more preferably about 50 wt % to about 80 wt %.

The activated carbon carrier includes activated carbon may be in granular, powder, or shaped carbon block form.

The hybrid ion exchange material does not lose 40% or more of ion exchange capacity after calcination at about 450° C. for 2 hours.

The ion exchange material's sorption capacity for the fluoride ion is from about 10 mg of fluoride per gram of ion exchange material to about 25 mg F/gram of ion exchange material.

The ion exchange material's sorption capacity for the $PO_4$ ion is from hemo-dialysate solution at a pH level in the range of approximately 5-6 of at least 50 mg $PO_4$ per gram of ion exchange material.

The ion exchange material's sorption capacity for the arsenate ion is from about 10 mg $AsO_4$ per gram of ion exchange material to about 25 mg $AsO_4$ per gram of ion exchange material at a pH level in the range of about 7 to 8.

The hybrid ion exchange material includes a capacity approximately 80%, or equal to that of the individual metal hydrous oxide used for selective sorption of fluoride ion and oxyanions of arsenic and phosphorus.

The alumina based mixed oxide may be impregnated or deposited in the pores of the activated carbon carrier as nano-size particles.

The activated carbon carrier includes a surface area in the range of 700-2000 m$^2$/g, and a pore volume in the range of 0.6-1.6 cm$^3$/g.

In a second aspect, the present invention is directed to a method for preparing a hybrid ion-exchange material comprising: (a) providing powder or granules of a porous active carbon support; (b) spraying an aqueous solution of aluminum-containing mixed oxide precursor onto the granules or powder of porous active carbon support; (c) drying impregnated support; (d) contacting the granules or powder of impregnated active carbon support with a solution of a base reagent at a pH sufficient to neutralize acidic aluminum-containing mixed oxide precursor in the support pores with formation of nano-sized hydrous mixed oxide in the pores; (e) washing the hybrid ion-exchange material with water to remove occluded electrolytes; and, (f) drying the hybrid ion-exchange material to an LOD approximately less than 10%.

The aluminum-containing mixed oxide precursor may include a water soluble compound including aluminum sulfate, aluminum chloride, aluminum nitrate, or combinations thereof.

The method further includes depositing a polyvalent metal compound comprising water soluble nitrates, chlorides, sulfates of titanium, zirconium, tin, cerium, lanthanum, iron, manganese, or combination of thereof.

The granules or powder of impregnated active carbon support may be treated with a base solution including alkali hydroxides, ammonium hydroxide, alkali carbonates, ammonium carbonate, or combinations thereof, at a pH level approximately in the range of 4-10.

The powder or granules of a porous active carbon support are preliminarily dried to evacuate physically adsorbed water from the pores.

The step of spraying the aqueous solution of aluminum-containing mixed oxide precursor onto the granules or powder of porous active carbon support is performed in amount sufficient to fill open pores of the support up to 90% of their volume.

The step of drying impregnated support is preferably performed until removal of 40% to 60% of added water is attained.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 depicts ion exchange properties of tested materials;

FIG. 2 depicts Al-27 MAS NMR spectra of prepared alumina hydroxide and hybrid materials for Examples 1-4;

FIG. 5 depicts the effect of thermal treatment on AsO$_4$ and Fluoride ion uptake on the mixed oxide of Example 1.

DESCRIPTION OF THE PREFERRED EMBODIMENTS

Figure 3:
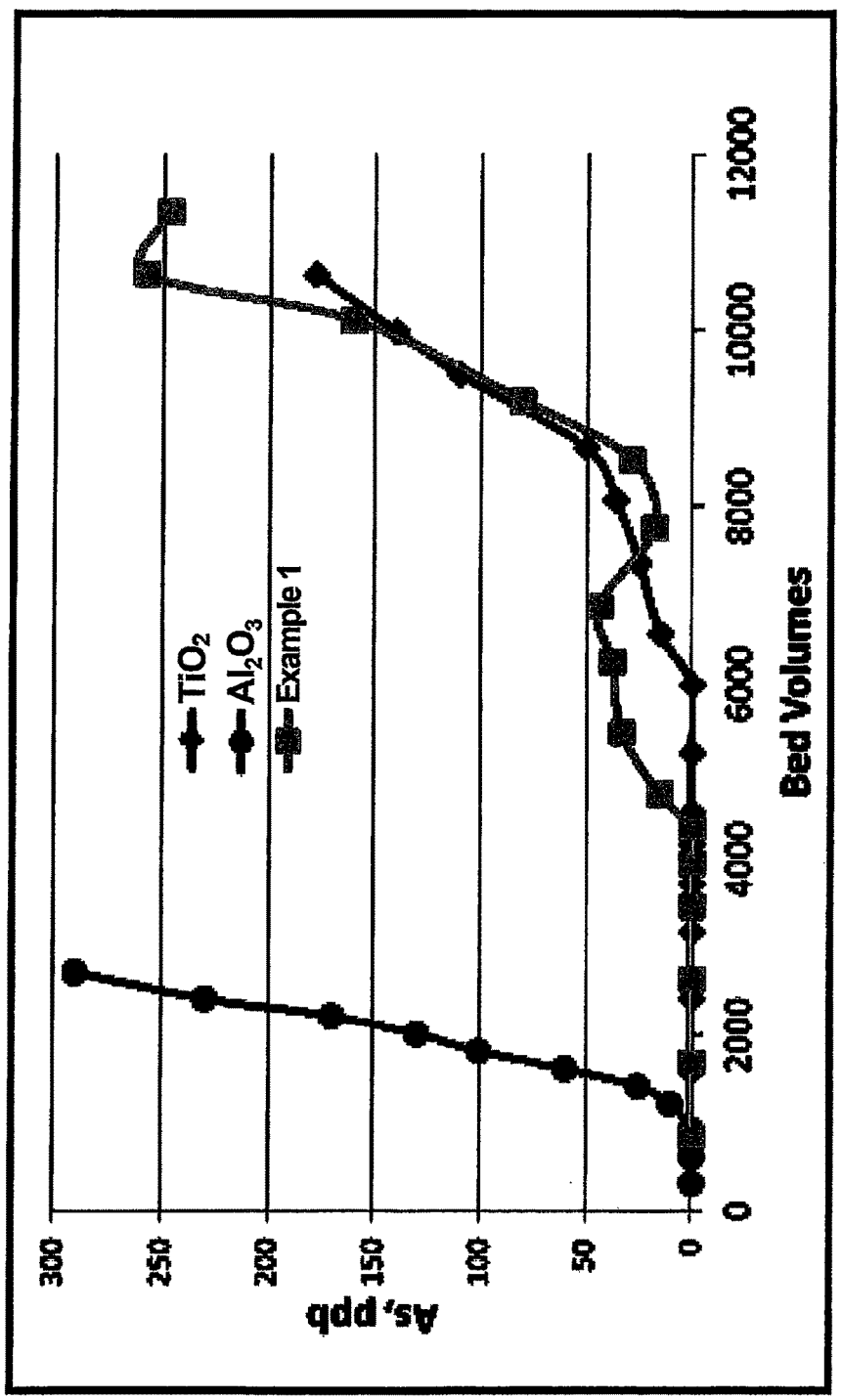
FIG. 3 depicts the comparative testing results of As removal (ppb) for various bed volumes of Example 1, TiO$_2$, and Al$_2$O$_3$.

In describing the preferred embodiment of the present invention, reference will be made herein to FIGS. 1-5 of the drawings in which like numerals refer to like features of the invention.

The deficiencies of the prior art can be overcome by the adsorbent of the present invention. The present invention is directed to a hybrid ion exchange material exhibiting high affinity and capacity towards organic molecules and simultaneously towards fluoride ion and oxyanions of phosphorus and arsenic in a broad pH range and in the presence of large excess competitive ions with capacity close to (not less than 80%) or equal to that of the individual metal hydrous oxide used for selective sorption of fluoride ion and oxyanions of arsenic and phosphorus.

A hybrid ion exchange material consists of activated carbon support impregnated with nano-sized mixed oxide comprising alumina, existing in tetra-, penta- and octahedral coordination at specific ratio, and doping oxides of polyvalent metals chosen from the group of elements titanium, zirconium, tin, cerium, lanthanum, iron, manganese, or any combination of thereof. A hybrid ion exchange material can be in granular, powder, or shaped (e.g., extruded carbon block) form with an approximate surface area of 700-2000 m$^2$/g and an approximate pore volume of 0.6-1.6 cm$^3$/g.

Referring to specific aspects of the invention, hybrid ion exchange material contains from about 5 wt % up to about 30 wt % of mixed oxide and, preferably, from about 10 wt % up to about 20 wt % of mixed oxide.

Another aspect of the present invention is that mixed oxide adsorbent contains from about 20 wt % up to about 80 wt % of alumina, preferably from 50 wt % up to about 80 wt % of alumina.

Another feature of the invention is that aluminum in the mixed oxide exists in octahedral, pentahedral, and tetrahedral coordination and the amount of pentahedrally coordinated aluminum is from about 10% to about 30%, and tetrahedrally coordinated aluminum is from about 5% up to about 15%.

The unexpected result of the present invention is a strong synergism between mixed oxide and activated carbon support, resulting in anion exchange capacity of the composite media towards fluoride ion and oxyanions of phosphorus and arsenic not less than 80-100% of the capacity of the individual polyvalent metal hydrous oxides used for impregnation when tested under similar conditions. Hybrid ion exchange material has a capacity on fluoride ion from about 10 mg F/gram of ion exchange material up to about 25 mg F/gram of ion exchange material at a pH range from about 7 to 6. Hybrid ion exchange material has a capacity on arsenate ion from about 10 mg AsO$_4$ per gram of ion exchange material up to about 25 mg AsO$_4$ per gram of ion exchange material at a pH range from about 7 to 8. Hybrid ion exchange material has a capacity on PO$_4$ ion from hemo-dialysate solution at a pH range from about 5 to 6 for at least 50 mg PO$_4$ per gram of ion exchange material.

An additional feature is that hybrid ion exchange material of the invention is thermally stable media that shows ion exchange capacity decrease less than 40% after calcination at 450° C. for 2 hours.

Another embodiment of the present invention is directed to a method for preparing a hybrid ion-exchange material which comprises:
a. providing powder or granules of a porous active carbon support that have been preliminary dried to evacuate physically adsorbed water from the pores;
b. spraying an aqueous solution of aluminum-containing mixed oxide precursor onto the granules or powder of porous active carbon support in amount sufficient to fill open pores of the support up to 90% of their volume. This operation allows for the introduction of soluble precursor specifically into the pores of activated carbon leaving support surface basically free from deposits;
c. drying the impregnated support until removal of 40% to 60% of the water added. This operation allows concentrate soluble mixed oxide precursor and spread it evenly onto the inner pore surfaces;
d. contacting granules or powder of impregnated active carbon support with a solution of a base reagent at a pH level sufficient to neutralize acidic aluminum-containing mixed oxide precursor in the support pores with the formation of nano-sized hydrous mixed oxide of the elements in the pores. In situ mixed oxide precipitation in a thin layer allows formation of nano-sized mixed oxides particles in contrast to formation of large primary particle aggregates with size from several hundred nano-meters to dozens of microns under standard precipitation without pore size limitations;
e. washing the hybrid ion-exchange material with water to remove occluded electrolytes; and,
f. drying the hybrid ion-exchange material via a Loss on Drying method (LOD) until the total change in weight of the material is less than 10%.

Specifically to the method solution of aluminum-containing mixed oxide precursor, a water soluble compound is used that includes aluminum sulfate, aluminum chloride, aluminum nitrate, and combinations thereof, and a polyvalent metal compound is used that includes water soluble nitrates, chlorides, sulfates of titanium, zirconium, tin, cerium, lanthanum, iron, manganese, or combinations of thereof. Alumina content in the mixed oxide precursor solution is generally from about 20 wt % up to about 80 wt %, and preferably from 50 wt % up to about 80 wt %.

Yet another feature of the method is that granules or powder of impregnated active carbon support are treated with base solution chosen from alkali hydroxides, ammonium hydroxide, alkali carbonates, ammonium carbonate, and combinations thereof, at a pH level that is preferably in the range of 4-10.

EXAMPLES

The present invention is described more specifically by reference to the following examples which are presented for exemplary purposes only, and are not intended to limit the invention described in the appended claims.

Example 1

The preparation of the activated carbon support includes drying 100 g of wood based powder carbon (preferably having a surface area of 1600 $m^2/g$, pore volume 1.1 $cm^3/g$, fraction 45-150 μm) at 150° C. for several hours to evacuate physically adsorbed water from carrier pores.

The preparation of 100 mL of mixed oxide precursor solution involves mixing 56.25 g of $Al(NO_3)_3*9H_2O$, 33.9 g of a 15.0 wt % (as $TiO_2$) titanyl sulfate solution, and 25 g of deionized water.

One hundred grams of dry activated carbon powder is then placed into a 500 mL glass beaker equipped with a mechanical mixer, and the prepared 100 mL of mixed oxide precursor is sprayed onto it during constant mixing. After addition of the entire precursor solution, the active carbon remains as "free flowing" powder with a dry appearance.

Impregnated activated carbon having total weight of approximately 215 g is placed into an electric oven at 100° C. and dried until its weight decreases to 185 g. This operation results in a removal of about 50% of water present in the carbon pores. The thermally treated impregnated activated carbon is then transferred in small portions, approximately 25-30 g each, to a 1 L glass beaker equipped with mechanical mixer, and containing 500 mL of a 1 M $NaHCO_3$ solution. The pH of the reaction mixture is kept in the range of approximately 7.2-7.8 by adding, if necessary, a 25% NaOH solution. When all carbon powder is added to the neutralizing solution the reaction system remains under mixing for 1 hour to complete the neutralization process and form seeds of nano-sized aluminum based mixed oxides in the pores of the support. Neutralized carbon is separated from the solution via filter, and washed with deionized water to remove excess occluded electrolytes. The washed product is then dried in electric oven at 100° C. to establish an LOD of about 8%.

The total mixed oxides loading into the activated carbon is 11 wt % (determined by ashing the product at 1100° C. in air for 6 hours). The mixed oxide loaded into activated carbon pores contains 60 wt % $Al_2O_3$ and 40 wt % $TiO_2$. Surface area of the hybrid ion exchange material is on the order of 1380 $m^2/g$ and the total pore volume is approximately 0.95 $cm^3/g$. Ion exchange properties of material are summarized in the table shown in FIG. 1.

Example 2

The preparation of the activated carbon support includes drying 100 g of wood based powder carbon (preferably having a surface area of 1600 $m^2/g$, pore volume 1.1 $cm^3/g$, fraction 45-150 μm) at 150° C. for several hours to evacuate physically adsorbed water from carrier pores.

The preparation of 100 mL mixed oxide precursor solution involves mixing 70.0 g of $Al(NO_3)_3*9H_2O$, 16.9 g of a 15.0 wt % (as $TiO_2$) titanyl sulfate solution, and 1.75 g of $MnSO_4*H_2O$ and 20 g of deionized water.

One hundred grams of dry activated carbon powder is then placed into 500 mL glass beaker equipped with mechanical mixer, and 100 mL of mixed oxide precursor is sprayed onto it under constant mixing. After addition of all precursor solution, active carbon remains as "free flowing" powder with a dry appearance.

Impregnated activated carbon having total weight of approximately 209 g is placed into an electric oven at 100° C. and dried until its weight decreases to 185 g. This operation results in a removal of about 50% of water present in the carbon pores. The thermally treated impregnated activated carbon is then transferred in small portions, approximately 25-30 g each, to a 1 L glass beaker equipped with a mechanical mixer, and containing 500 mL of a 1 M $NaHCO_3$ solution. The pH of the reaction mixture is kept in the range of approximately 7.2-7.8 by adding, if necessary, a 25% NaOH solution. When all carbon powder is added to the neutralizing solution, the reaction system remains under mixing for 1 hour to complete neutralization process, and form seeds of nano-sized aluminum based mixed oxides in the pores of the support. Neutralized carbon is then separated from solution via filter and washed with deionized water to remove excess occluded electrolytes. The washed product is then dried in electric oven at 100° C. to establish an LOD of about 5%.

Total mixed oxides loading into activated carbon is 11 wt % (determined by ashing product at 1100° C. in air for 6 hours). Mixed oxide loaded into activated carbon pores contains 75 wt % $Al_2O_3$, 20 wt % $TiO_2$, and 5 wt % $MnO_2$. Surface area of the hybrid ion exchange material is 1350 $m^2/g$ and its total pore volume is 0.95 $cm^3/g$. The ion exchange properties of material are summarized in the table shown in FIG. 1.

Example 3

The preparation of 100 mL mixed oxide precursor solution comprises mixing 66.15 g of $Al(NO_3)3*9H_2O$, 18.22 g of $FeCl_3$ and 25 g of deionized water. The type of activated carbon, preparation of activated carbon support, and doping process are similar to that described in Example 1.

The hybrid ion exchange material is dried to LOD=5%. The total mixed oxides loading into activated carbon is approximately 15.5 wt %. The mixed oxide loaded into activated carbon pores contains 50 wt % $Al_2O_3$ and 50 wt % $Fe_2O_3$. The surface area of hybrid ion exchange material is 1220 $m^2/g$ and its total pore volume is 0.90 $cm^3/g$. The ion exchange properties of material are summarized in the table in FIG. 1.

Example 4

The preparation of 100 mL mixed oxide precursor solution comprises mixing 77.2 g of $Al(NO_3)3*9H_2O$, 10 g of a 30% $Ce(NO_3)_3$ (on $CeO_2$) solution, 6 g of a 25% zirconyl nitrate (on $ZrO_2$) solution, and 15 g of deionized water. The type of activated carbon, preparation of activated carbon support, and doping process is similar to that described in Example 1.

The dried hybrid ion exchange material has an LOD=7%. The total mixed oxides loading into activated carbon is 13 wt %. The mixed oxide loaded into activated carbon pores contains 70 wt % $Al_2O_3$, 20 wt % $CeO_2$, and 10 wt % $ZrO_2$. The surface area of hybrid ion exchange material is 1320 $m^2/g$ and its total pore volume is 0.95 $cm^3/g$. The ion exchange properties of material are summarized in the table in FIG. 1.

The Al-27 MAS NMR spectra of prepared alumina hydroxide and hybrid materials have been recorded on a Bruker Avance III 400 MHz spectrometer for Examples 1-4 and are depicted in the table of FIG. 2.

Example 5

Adsorption experiments have been carried out under batch conditions with a contact time of 18 hours. The following test solutions have been used in the adsorption experiments:
a. Fluoride ion—10 ppm F+2 mM $NaHCO_3$+2 mM $Na_2SO_4$, pH=6;
b. Phosphate ion—96 ppm $PO_4$, 140 mM Na, 2 mM K, 1.5 mM Ca, 0.5 mM Mg, pH=7.4; and
c. Arsenate ion—3.7 ppm $AsO_4$+2 mM $NaHCO_3$, pH=8.

For comparison purposes commercial adsorbents Granular Ferric Oxide (GFO) (Bayer AG), MetSorb® (Graver Technologies LLC), activated alumina AA400, and zirconium hydrous oxide have been used.

Example 6

Comparative testing was performed of arsenate ion removal on aluminum hydrous oxide, titanium hydrous oxide (MetSorb®) and the hybrid ion exchanger from Example 1 under column conditions. Sorption has been carried out from 2 mM $NaHCO_3$ solution containing 300 ppb As(V) at a pH level of 8.3, and a flow rate of 100 BV/hr. The column contained 1.00 g of media. FIG. 3 depicts the comparative testing results of As removal (ppb) for various bed volumes of Example 1, $TiO_2$, and $Al_2O_3$.

Example 7

Figure 4:
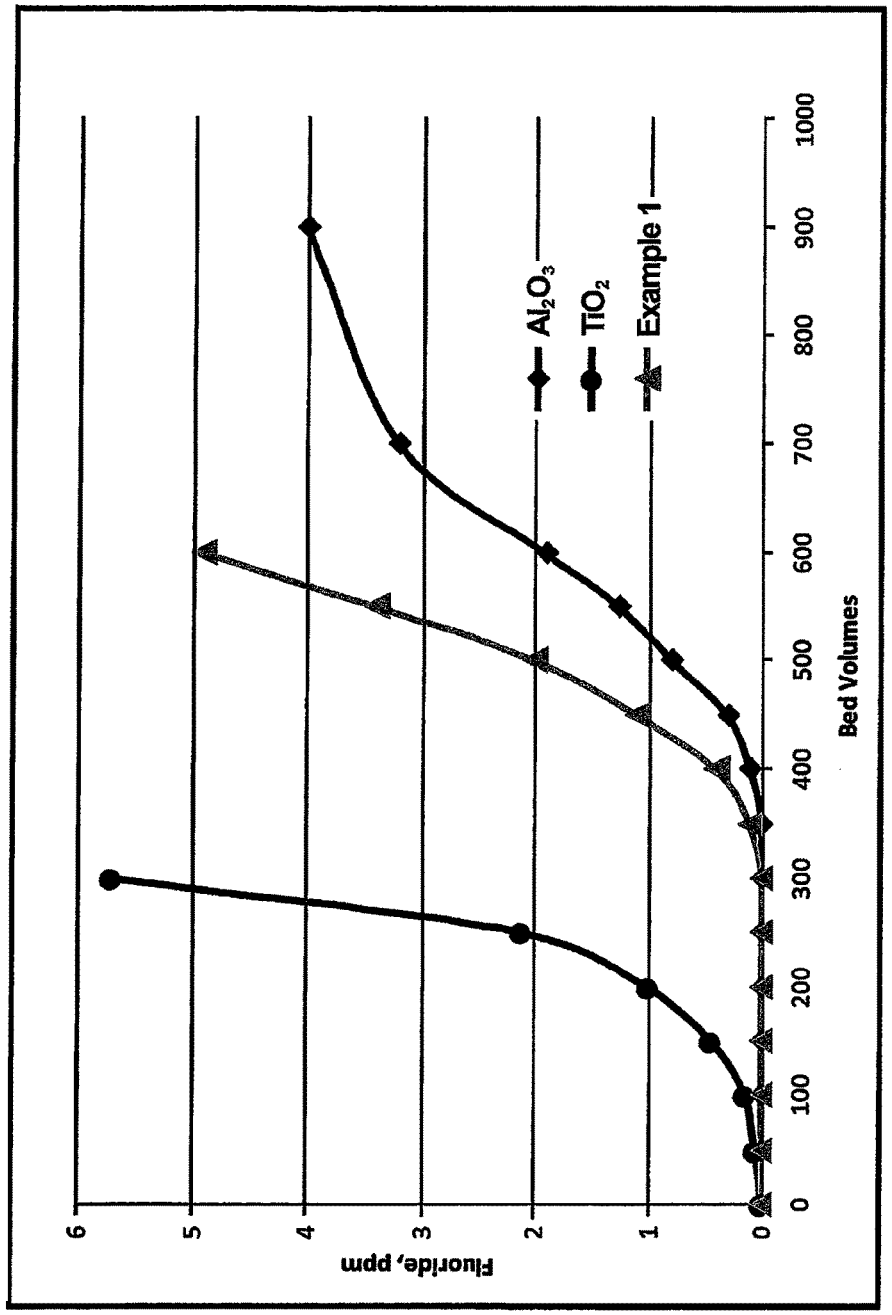
FIG. 4 depicts the comparative testing results of Fluoride removal (ppb) for various bed volumes of Example 1, TiO$_2$, and Al$_2$O$_3$.

Comparative testing was performed of fluoride ion removal on aluminum hydrous oxide (AA400G), titanium hydrous oxide (MetSorb®) and hybrid ion exchanger from Example 1 under column conditions. Sorption was carried out using tap water spiked with 6.5 ppm F, pH=8.3, and a flow rate of 100 BV/hr. The column contained 1.00 g of media. FIG. 4 depicts the comparative testing results of As (ppb) for various bed volumes of Example 1, $TiO_2$, and $Al_2O_3$. FIG. 4 depicts the comparative testing results of Fluoride removal (ppb) for various bed volumes of Example 1, $TiO_2$, and $Al_2O_3$.

Example 8

The effect of thermal treatment on $AsO_4$ and Fluoride ion uptake on mixed oxide of Example 1 is shown in the table of FIG. 5. The arsenic test solution contained 3.7 ppm $AsO_4$ at a pH level of 8. The fluoride test solution contained 10 ppm F in tap water at a pH level of 7.5. The contact time was approximately 18 hours.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
1. A method for preparing a hybrid ion-exchange material comprising:
   a. providing powder or granules of a porous active carbon support;
   b. spraying an aqueous solution of aluminum-containing mixed oxide precursor onto said granules or powder of porous active carbon support to form an impregnated support;
   c. drying said impregnated support;
   d. contacting said granules or powder of impregnated active carbon support with a solution of a base reagent at a pH sufficient to neutralize acidic aluminum-containing mixed oxide precursor in said support pores with formation of nano-sized hydrous mixed oxide in the pores;
   e. washing said hybrid ion-exchange material with water to remove occluded electrolytes; and
   f. drying said hybrid ion-exchange material to an LOD of approximately less than 10%.

2. The method of claim 1 wherein said aluminum-containing mixed oxide precursor comprises a water soluble compound including aluminum sulfate, aluminum chloride, aluminum nitrate, or combinations thereof.

3. The method of claim 2 including depositing a polyvalent metal compound comprising water soluble nitrates, chlorides, sulfates of titanium, zirconium, tin, cerium, lanthanum, iron, manganese, or combination of thereof.

4. The method of claim 1 wherein alumina content in said mixed oxide precursor is approximately in the range of 20 wt % to 80 wt %.

5. The method of claim 1 wherein alumina content in the mixed oxide precursor is approximately in the range of 50 wt % to 80 wt %.

6. The method of claim 1 wherein granules or powder of said impregnated active carbon support are treated with base solution including alkali hydroxides, ammonium hydroxide, alkali carbonates, ammonium carbonate, or combinations thereof, at a pH level approximately in the range of 4-10.

7. The method of claim 1 wherein said powder or granules of a porous active carbon support are preliminarily dried to evacuate physically adsorbed water from the pores.

8. The method of claim 1 wherein said step of spraying said aqueous solution of aluminum-containing mixed oxide precursor onto said granules or powder of porous active carbon support is performed in amount sufficient to fill open pores of said support up to 90% of their volume.

9. The method of claim 1 wherein said step of drying said impregnated support is performed until removal of 40% to 60% of added water is attained.

* * * * *